July 16, 1957 H. T. MORTIMER 2,799,738

MAGNETIC POWER AMPLIFIER

Filed July 27, 1956

INVENTOR
HARRY T. MORTIMER

BY W R Mattox
Richard C Reed
ATTORNEYS

United States Patent Office 2,799,738

Patented July 16, 1957

2,799,738

MAGNETIC POWER AMPLIFIER

Harry T. Mortimer, Los Angeles, Calif.

Application July 27, 1956, Serial No. 600,638

6 Claims. (Cl. 179—171)

(Granted under Title 35, U. S. Code (1952), sec. 266)

The invention described herein may be manufactured and used by or for the Government of the United States of America for governmental purposes without the payment of any royalties thereon or therefor.

This invention relates in general to power amplifiers and in particular to magnetic power amplifiers.

A wide variety of power amplifiers are available for producing a power output proportional to an input signal. However, as reliability, size and weight become increasingly important consideration in modern applications such as high altitude rocket design, for example, the great majority of these prior art devices are not suitable. It will be appreciated that a compact and light weight power amplifier is needed and would be welcomed as a highly desirable advancement of the art.

Accordingly:

It is an object of this invention to provide a magnetic power amplifier utilizing a minimum number of component parts.

It is another object of this invention to provide an improved magnetic power amplifier which includes an internal A. C. voltage source and requires only a D. C. voltage external source for its operation.

It is still another object of this invention to provide a power amplifier involving no significant warm-up delay.

It is an additional object of this invention to provide a power amplifier which permits the pulse-time modulation of a square wave.

Other objects of the invention will become apparent upon a more comprehensive understanding of the invention for which reference is had to the following specification and the drawings.

Figure 1:
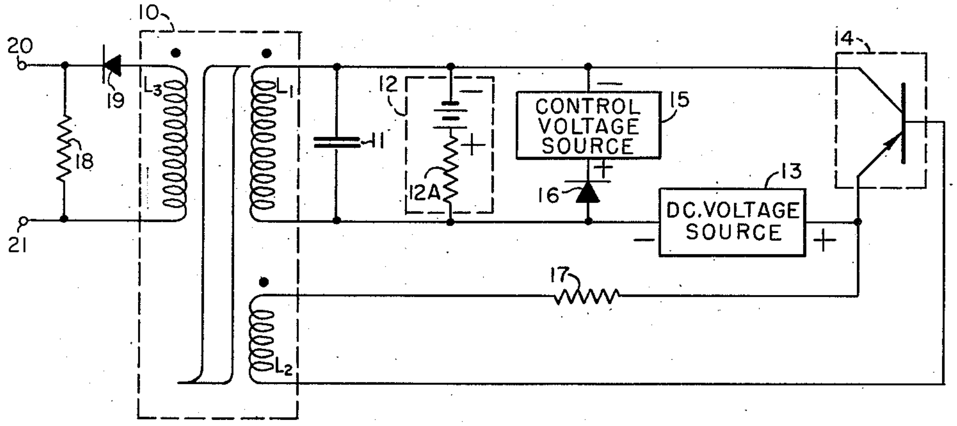
Fig. 1 is a schematic showing of preferred embodiment of the invention.

A rectangle is drawn between the transformer windings in Fig. 1 to indicate a core material having a substantially rectangular hysteresis characteristic.

Briefly, the device of this invention incorporates a transformer of the type generally employed in magnetic amplifiers, an on-off transistorized switching means, a constant current source, a charging capacitor, a constant D. C. voltage source, a D. C. control voltage source, and several rectifiers in a magnetic power amplifier circuitry. An automatic switching arrangement is employed wherein a positive switching action is obtained by a core material saturation condition sensitive control means. The device provides a pulse-time modulated output by half wave rectification of a regulated square wave, varying the time interval between half wave pulses in accordance with a control input and then averaging the rectified output per unit time. The device is particularly useful in remote control applications such as to govern the rotation of a rotating solenoid.

An exemplary and preferred embodiment of the invention which is demonstrative of the basic principle of operation of the invention is shown in Fig. 1. In this embodiment a magnetic core material having a substantially rectangular hysteresis characteristic is utilized for the transformer 10. Transformer 10 comprises three windings $L_1$, $L_2$ and $L_3$, with the windings having the dot indicated winding sense or polarity relationship.

In the exemplary embodiment of Fig. 1, a capacitor 11, a constant current source 12, including an internal series impedance 12A, plus a serially connected D. C. voltage source 13 and switching means 14 are connected in parallel across the excitation winding $L_1$. In addition, a serially connected control voltage source 15 and a unidirectional element 16 are connected across the winding $L_1$ for the purpose of applying an input control signal.

In this particular embodiment, a PNP type junction transistor is shown as the switching means 14. For reasons which will become apparent hereinafter, the transistor collector terminal is connected to the dotted end of the winding $L_1$, the emitter terminal is connected to the positive terminal of the D. C. voltage source 13 and the base winding $L_2$ is connected via the current limiting impedance 17 across the base and emitter terminals of the transistor.

An impedance 18 is connected via the unidirectional element 19 across the output terminals 20 and 21 of the winding $L_3$ as a dissipative load impedance. The impedance 18 is illustrative of the field impedance of the previously mentioned rotating solenoid, for example.

For purposes of analysis each full operational cycle of the device of this invention is divisible into half cycle modes with automatic switching between modes.

In the first half cycle mode the switching means 14 is closed. Under this condition, the constant current source 12 effectively ignores the two relatively high impedance paths, one via the winding $L_1$, the other via the control voltage source 15, and current flows from the positive terminal of the constant current source through the serially connected voltage source 13 and the switching means 14 back to the negative terminal thereof. At the same time current from the D. C. voltage source 13 flows through the switching means 14 and into the winding $L_1$ in such a direction as to send the core material toward positive saturation, in this instance, into the dotted end of the winding. Thus it will be seen that it is important to this invention that the D. C. voltage source 13 be capable of providing a current of sufficient magnitude to carry the core material from one saturation level to the other during the first half cycle mode. That is, the period of the first half cycle mode times the magnitude of the output of voltage source 13 must be at least equal to the volt second constant for the particular core material.

As current flows in the winding $L_1$, a voltage is induced in the windings $L_2$ and $L_3$. The voltage induced in the winding $L_3$ appears across the load impedance as an output pulse during the full period of the first half cycle mode. The voltage induced in the winding $L_2$ is applied across the base and emitter terminals of the transistor to control the operation thereof.

In brief explanation of the operation of PNP type junction transistors as a switching means, as the base is made more negative with respect to either emitter or collector, the transistor will conduct, that is, its emitter to collector impedance will be reduced. On the other hand, if the base is made positive with respect to both emitter and collector, the transistor will block. During the first half cycle mode, the voltage induced in the winding $L_2$ is applied across the base and emitter to hold the base negative with respect to the emitter in order that the switching means will be in the conducting state.

As the core material continues to approach and finally reaches its positive saturation level the base of the transistor remains negatively polarized while the respective impedance of the windings $L_1$ and $L_2$ are reduced. As the impedance of the winding $L_1$ is reduced an increasing portion of the voltage output of source 13 is dropped across the transistor switching means 14 and less voltage is dropped across the winding $L_1$. Thus a lesser voltage is induced in the winding $L_2$ which reduces the magnitude of the potential across the emitter and base of the transistor. Consequently, the emitter to collector impedance of the transistor begins to increase and an avalanche effect is produced which rapidly decreases the current flowing through the winding $L_1$. This avalanche effect, of course, results in a collapse of the flux in the core material of transformer 10 which leaves the core in a saturated remanence condition.

The voltage induced in the winding $L_2$ by this flux collapse thus applies a voltage of opposite polarity to that previously applied across the emitter-base terminals of the transistor 14 which brings the emitter and collector impedance to its highest value. With this flux collapse, the switching is completed and the second half cycle mode is begun.

Whereas the magnetization current in the winding $L_1$ increases as the saturation level is approached, it will be seen that a large inductive kick is produced when the switching means 14 subsequently blocks. This inductive kick rapidly charges the capacitor 11 connected across the winding $L_1$ with a voltage of the same polarity as that of the constant current source 12 and control voltage source 15. Thus at the beginning of the second half cycle mode, the capacitor 11 is charged with a relatively high voltage.

During the second mode of the operational cycle, both the constant current source 12 and the capacitor 11 send current into the undotted end of the winding $L_1$ to carry the core material toward negative saturation.

In this power amplifier applicaiton, the current capacity of the constant current source 12 is substantially greater than the initial magnetization current for the particular core. Thus at the beginning of the second mode, with an open control circuit or with a maximum control voltage, the constant current source serves to supplement and to maintain the charge on the capacitor as well as to provide all of the current flowing through the winding $L_1$. As the core progresses toward negative saturation, the back E. M. F. is decreased so the magnetization current is increased and, with the same control voltage, the full output of the constant current source 12 is gradually applied to the winding $L_1$. Finally as the core nears its saturation level, the charged capacitor 11 begins to supply a portion of the saturating current.

As in the previous mode, a voltage is induced in both the windings $L_2$ and $L_3$ when the core material is being brought from one saturation level to the other. In this mode, however, the voltage induced in the winding $L_3$ does not appear as an output pulse since the unidirectional element 19 permits current flow in only one direction and the load impedance is isolated thereby. The voltage induced in the winding $L_2$ again serves to control the operation of the transistor. In the second mode, the voltage induced in the winding $L_2$ provides the transistor with a positive base circuit which holds the switching means in its blocked condition.

To continue the second mode operaional analysis, when the core material reaches its negative saturation level, the winding $L_1$ again exhibits its lower impedance which permits a final discharge of the capacitor 11 in a large current surge. Upon final discharge of the capacitor the saturation current decays and this decay provides the initial impulse which starts the transistor switching means 14 toward its conducting state and the switching action previously described again occurs, this time to convert the switching means to full conduction.

With the switching means conducting, the D. C. supply voltage 13 is again applied across the winding $L_1$ to bring the core material to its positive saturation level and the operation begins anew in cyclic fashion.

From the above analysis of the operational cycle, it will be seen that the period of the first half cycle mode, which is constant in this invention, is largely dependent upon the particular core material employed and the magnitude of the output of D. C. voltage source 13. The period of the second half cycle mode, which is variable in this pulse-time modulation device, is primarily controlled by the size of the capacitor 11 and by the magnitude of the output of the constant current source 12 which controls the discharge rate of the capacitor 11. In the invention the control voltage source 15 acts as a shunting means for the output of the constant current source 12. Thus by varying the voltage of the control voltage source the amount of the constant current source contribution to the saturating current flowing through the winding $L_1$ may be controlled. In other words, the discharge rate of the capacitor 11 may be controlled by varying the voltage output of the control voltage source 15 which in turn determines the period of the second half cycle mode.

As an example of the control provided by the control voltage source 15, a 100 volt, 1 ma. constant current source 12 having an internal impedance 12A of .1 megohm might send 0.5 ma. into the winding $L_1$ as the second half cycle mode begins. Substantially all of the remaining 0.5 ma. would then be shunted through the unidirectional element 16 and the control voltage source 15. Since 50 volts is dropped across the impedance 12A it will be seen the remaining 50 volts is dropped across the control voltage source 15. Since the current through the control voltage source is a reverse current it will be seen that by varying the voltage output of the control voltage source between 0 and 50 volts, the voltage across the terminals of the winding $L_1$ may be varied between the limits, 0 and 50 volts. It may be said that the control voltage source 15 absorbs power, that is, it operates as a variable dissipative means to control the period of the second half cycle mode.

It has been found that as the control voltage is reduced, the power gain is increased. Theoretically, the power gain is infinite when the control voltage is zero. As a practical limitation, however, it has been found that oscillation in the device becomes increasingly unstable as the control signal is reduced to zero. Consequently, it is preferable to use control voltages of finite value.

Figure 2:
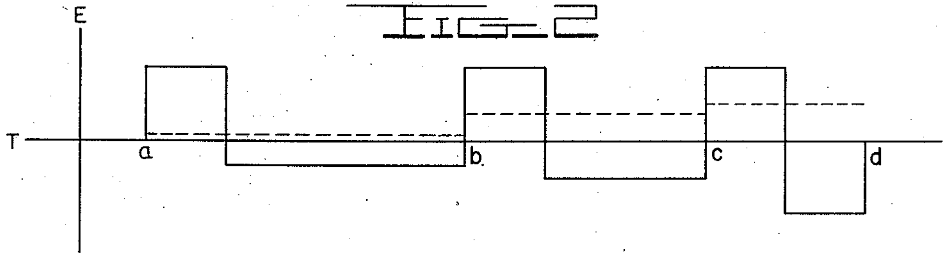
Fig. 2 is a graphical showing of output voltage waveforms for the embodiment of Fig. 1.

A typical output voltage waveform for the embodiment of Figure 1 is shown in Figure 2. A single cycle for each of several different input control voltages is shown in the drawing. From left to right each succeeding cycle, *a* to *b*, *b* to *c*, *c* to *d*, represents a higher input control voltage. From a comparison of these three cycles, it will be noted that the average voltage per unit time, as indicated by the dotted lines, increases as the input control voltage increases.

The embodiment of Fig. 1 has been constructed and tested utilizing a Deltamax 50018–1A transformer core material and a Hytron HD197 PNP type junction transistor. In this operating model the D. C. source 13 supplied 20 volts and the constant current source 12 comprised a 90 volt D. C. source with a 1000 ohm resistor in series therewith. The capacity of the capacitor 11 was 0.1 mfd. and the load impedance measured 80 ohms. The windings $L_1$, $L_2$ and $L_3$ had 600, 60 and 600 turns, respectively.

Figure 3:
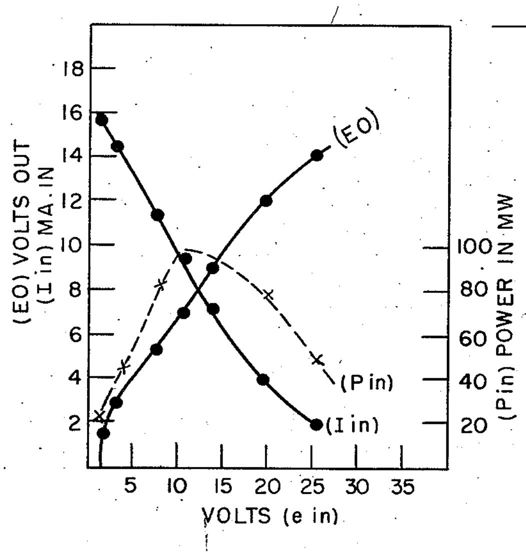
Fig. 3 is a graphical showing of typical performance characteristics for the embodiment of Fig. 1.

Typical performance characteristics for a 2.5 watt model of the embodiment of Fig. 1 constructed as outlined above are illustrated in Fig. 3. As shown in the drawing, the voltage out (EO) was found to be directly proportional to the control voltage (*e* in).

It is understood, of course, that the component values listed above are for a particular operating model of the invention with no specific application intended. Therefore, it is to be emphasized that these values are not necessarily those for optimum performance in every application of the device. More particularly it is understood that these componet values are not to be considered as limiting the invention.

Furthermore, it is understood that any other type of switching means capable of performing the on-off function provided by the PNP type junction transistor might be substituted therefor without departing from the purview of the invention.

Finally, this invention is to be limited only by the scope of the claims appended hereto.

What is claimed is:

1. A magnetic power amplifier comprising a plurality of mutually inductive windings wound on a core of a material having a substantially rectangular hysteresis characteristic; a first D. C. voltage source and an on-off switching means for periodically interrupting current flow serially connected across a first winding in said plurality; a capacitive means connected across said first winding; a constant current source connected across said first winding; a first unidirectonal means and a second D. C. voltage source serially connected across said first winding; said constant current source and said second D. C. voltage source being connected in opposing polarity to said first D. C. voltage source; means for varying the output of said second D. C. voltage source in accordance with an input signal; the output current of said first D. C. voltage source being sufficient to bring said core from one saturation level to the other during the period said switching means will conduct current, controlling means for controlling the operation of said switching means connected to a second winding of said plurality and operable in accordance with the polarity of the voltage induced in said second winding by the passage of current in said first winding; and output means connected across a winding of said plurality other than said first winding via a second unidirectional means for obtaining a rectified output therefrom.

2. A magnetic power amplifier comprising a plurality of mutually inductive windings wound on a core of a material having a substantially rectangular hysteresis characteristic; a first D. C. voltage source; an on-off PNP type junction transistor switching means for periodically interrupting current flow, said transistor switching means having emitter, collector and base connections; said first D. C. voltage source and the emitter-collector connections of said transistor being serially connected across a first winding in said plurality; a capacitive means connected across said first winding; a constant current source connected across said first winding; a first unidirectional means and a second D. C. voltage source serially connected across said first winding; said constant current source and said second D. C. voltage source being connected in opposing polarity to said first D. C. voltage source; means for varying the output of said second D. C. voltage source in accordance with an input signal; the output current of said first D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding via a second unidirectional means for obtaining a rectified output therefrom.

3. A magnetic power amplifier comprising a plurality of mutually inductive windings wound on a core of a material having a substantially rectangular hysteresis characteristic; a first D. C. voltage source and an on-off switching means for periodically interrupting current flow serially connected across a first winding in said plurality; a capacitive means connected across said first winding; polarized means for controlling the discharge rate of said capacitive means connected across said first winding; a first unidirectional means and a second D. C. voltage source serially connected across said first winding; said polarized means for controlling the discharge rate of said capacitor and said second D. C. voltage source being connected in opposing polarity to said first D. C. voltage source; means for varying the output of said second D. C. voltage source in accordance with an input signal; the output current of said first D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding via a second unidirectional means for obtaining a rectified output therefrom.

4. A magnetic power amplifier comprising a plurality of mutually inductive windings wound on a core of a material having a substantially rectangular hysteresis characteristic; a first D. C. voltage source; an on-off PNP type junction transistor switching means for periodically interrupting current flow, said transistor switching means having emitter, collector and base connections; said first D. C. voltage source and the emitter-collector connections of said transistor being serially connected across a first winding in said plurality; a capacitive means connected across said first winding; polarized means for controlling the discharge rate of said capacitive means connected across said first winding; a first unidirectional means and a second D. C. voltage source serially connected across said first winding; said polarized means for controlling the discharge rate of said capacitor and said second D. C. voltage source being connected in opposing polarity to said first D. C. voltage source; means for varying the output of said second D. C. voltage source in accordance with an input signal; the output current of said first D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding via a second unidirectional means for obtaining a rectified output therefrom.

5. A magnetic power amplifier comprising a plurality of mutually inductive windings wound on a core of a material having a substantially rectangular hysteresis characteristic; a first D. C. voltage source and an on-off switching means for periodically interrupting current flow serially connected across a first winding in said plurality; a capacitive means connected across said first winding; a constant current source connected across said first winding; a first unidirectional means and a second D. C. voltage source serially connected across said first winding; said constant current source and said second D. C. voltage source being connected in opposing polarity to said first D. C. voltage source; means for varying the output of said second D. C. voltage source in accordance with an input signal; the output current of said first D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a third winding of said plurality via a second unidirectional means for obtaining a rectified output therefrom.

6. A magnetic power amplifier comprising a plurality of mutually inductive windings wound on a core of a material having a substantially rectangular hysteresis characteristic; a first D. C. voltage source and an on-off switching means for periodically interrupting current flow serially connected across a first winding; a constant current source connected across said first winding; a first unidirectional means and a second D. C. voltage source serially connected across said first winding; said constant current source and said second D. C. voltage source being connected in opposing polarity to said first D. C. voltage source; means for varying the output of said second D. C. voltage source in accordance with an input signal; the output current of said constant current source being greater than the initial magnetization current of said first winding on said core; the output current of said first D. C. voltage source being sufficient to bring said core from one saturation level to the other during the period said switching means will conduct current, controlling means for controlling the operation of said switching means connected to a second winding of said plurality and operable in accordance with the polarity of the voltage induced in said second winding by the passage of current in said first winding; and output means connected across a winding of said plurality other than said first winding via a second unidirectional means for obtaining a rectified output therefrom.

No references cited.